United States Patent [19]
Ehrlinger et al.

[11] Patent Number: 4,616,520
[45] Date of Patent: Oct. 14, 1986

[54] ARRANGEMENT OF A BRAKE IN A WHEEL HEAD EQUIPPED WITH REDUCING GEAR

[75] Inventors: Friedrich Ehrlinger, Friedrichshafen; Karl-Hermann Katzorek, Tettnang; Peter Dziuba, Überlingen; Karl Veser, Friedrichshafen; Peter Caspar, Oberteuringen, all of Fed. Rep. of Germany

[73] Assignee: Zahnradfabrik Friedrichshafen Aktiengesellschaft, Friedrichshafen, Fed. Rep. of Germany

[21] Appl. No.: 644,729
[22] PCT Filed: Oct. 5, 1983
[86] PCT No.: PCT/EP83/00259
 § 371 Date: Aug. 23, 1984
 § 102(e) Date: Aug. 23, 1984
[87] PCT Pub. No.: WO84/02498
 PCT Pub. Date: Jul. 5, 1984

[30] Foreign Application Priority Data
Dec. 28, 1982 [DE] Fed. Rep. of Germany ....... 3248250

[51] Int. Cl.$^4$ ............................................. F16H 57/10
[52] U.S. Cl. .................................... 74/325; 74/391; 74/411.5; 74/760; 192/4 A
[58] Field of Search ............... 74/391, 760, 325, 785, 74/411.5; 192/4 A, 4 R

[56] References Cited
U.S. PATENT DOCUMENTS

| | | | |
|---|---|---|---|
| 2,612,786 | 10/1952 | Schmitter | 74/325 |
| 3,148,556 | 9/1964 | Gibbs et al. | 74/325 |
| 4,010,830 | 3/1977 | Logus et al. | 192/4 A |
| 4,037,694 | 7/1977 | Keese | 192/4 A |
| 4,043,226 | 8/1977 | Buuck | 74/391 X |
| 4,142,615 | 3/1979 | Sidles, Jr. et al. | 192/4 A |
| 4,270,412 | 6/1981 | Beijer et al. | 74/391 X |
| 4,317,498 | 3/1982 | Jirousek et al. | 74/391 X |
| 4,391,351 | 7/1983 | Jirousek et al. | 74/391 X |

FOREIGN PATENT DOCUMENTS

| | | | |
|---|---|---|---|
| 2548473 | 5/1976 | Fed. Rep. of Germany | 74/391 |
| 2726687 | 12/1977 | Fed. Rep. of Germany | . |
| 2726775 | 12/1977 | Fed. Rep. of Germany | . |
| 3013431 | 12/1981 | Fed. Rep. of Germany | . |
| 971212 | 9/1964 | United Kingdom | 74/325 |
| 1483731 | 8/1977 | United Kingdom | . |

*Primary Examiner*—Lawrence J. Staab
*Assistant Examiner*—Dwight G. Diehl
*Attorney, Agent, or Firm*—Karl F. Ross; Herbert Dubno

[57] ABSTRACT

An axially segmented brake arrangement in a hub-shaped planetary gear wheel head for a driven axle has a sleeve which couples the two central shaft sections nonrotatably together so that the sun wheel section can be replaced or be interchangeable to enable sun wheels of different diameters to be used even once the brake has been assembled. The sleeve which serves this function is connected by a web to a rim or spur gear located radially outwardly of the sleeve at the level of the planet gear shaft, this spur gear carrying the internally toothed brake disks of a stack of such disks interleaved with externally toothed disks engaging an internally toothed hollow shaft meshing with the planet gears, surrounding the brake disk stack and carried by a hollow shaft carrier which receives the power assist mechanism for the brake and is mounted on a hollow axle extending into the hub forming housing which is connected to the planet carrier.

8 Claims, 2 Drawing Figures

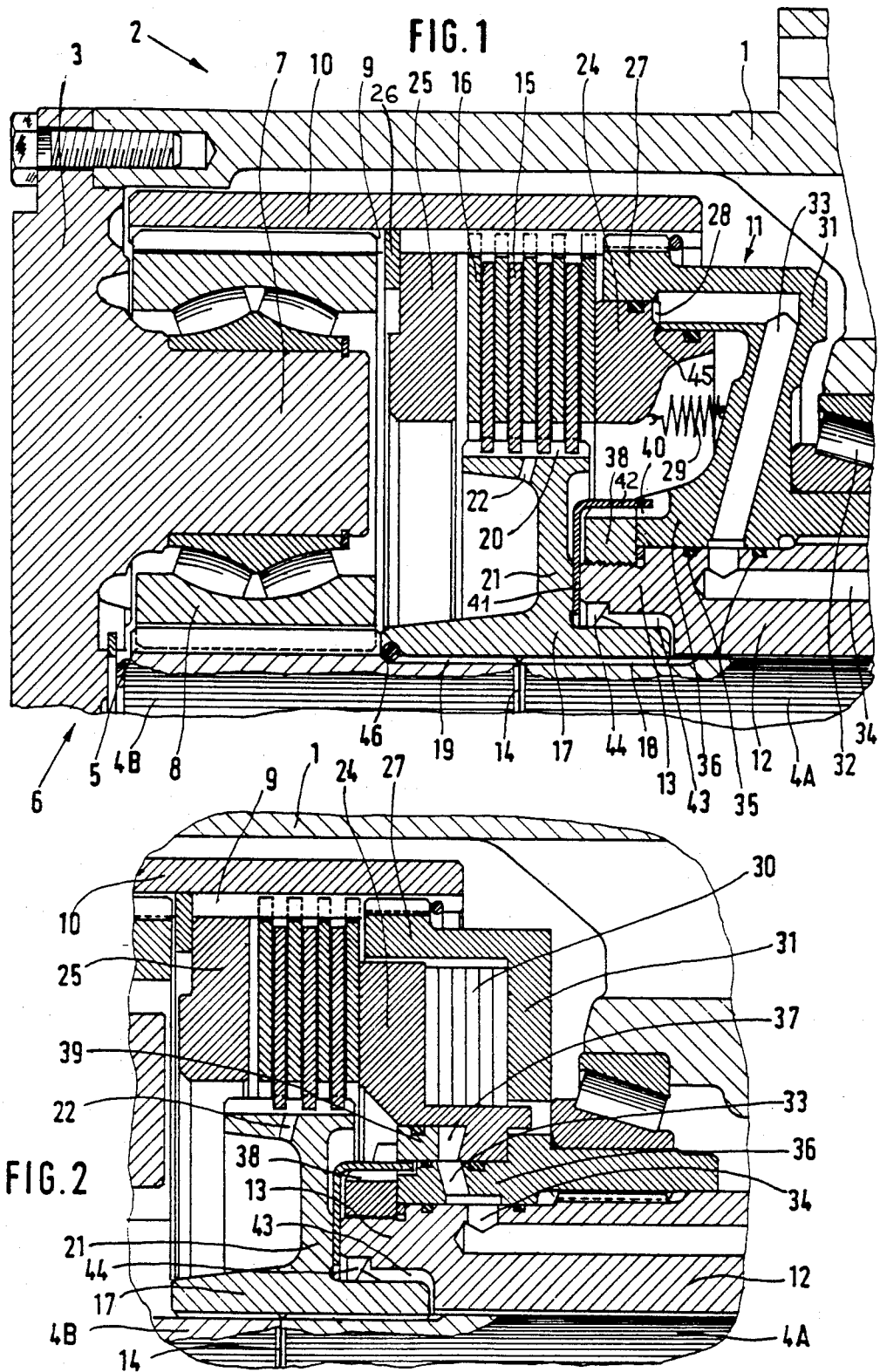

ARRANGEMENT OF A BRAKE IN A WHEEL HEAD EQUIPPED WITH REDUCING GEAR

CROSS REFERENCE TO RELATED APPLICATIONS

This application is a national phase application corresponding to PCT/EP83/00259 filed Oct. 5, 1983 and based, in turn, upon a German application of Dec. 28, 1982 under the International Convention.

FIELD OF THE INVENTION

The invention relates to an arrangement of a brake in a wheel head equipped with reducing gear.

BACKGROUND OF THE INVENTION

Known arrangements of brakes in wheel heads (see German Patent Application No. 30 13 431.7-21 or U.S. Pat. No. 4,037,694) have internal brake disks non-rotatably secured to the set of teeth of the sun wheel of the reducing gear driven by a differential shaft and external brake disks non-rotatably secured to the set of teeth of the hollow wheel which is steadfastly mounted in its housing, whereby power-assistance means is provided in the carrier of the hollow wheel as a brake pressure annular piston, operated by a pressure medium.

The disadvantages of these usual constructions currently known become evident especially in the production of large series of axles with such wheel heads and in their use in practice. Because of the interchangeable dimensional relationship of the construction parts with regard to each other it has proven difficult to provide for adaptability to changing user requirements (performance, way of brake actuation, maintainance), since it was almost impossible to create any equipment variations with a single, definitely established axle concept. For instance, in the case of the aforementioned hollow wheel with the differential shaft not only the ratio of the reducing gear, but also the effective diameter of the brake disks, the mode of securing the hollow wheel carrier and as a result also the type of power assist are rigidly established. The ratio could not be varied further since the diameter of the hollow wheel was rigidly established. In the case of given larger hollow wheels, disadvantageous diameter ratios D/d of the brake disks also resulted, which means that in certain ranges of the rotation rate these would run erratically and be prematurely damaged or their braking efficiency would be impaired. When for instance, a different hollow wheel carrier became necessary due to a different power-assisting means, the placed available in the housing was not sufficient or the supply of the pressure means in the hollow axle did not suit the arrangement of the brake piston in the carrier of the hollow wheel. Due to such interdependencies not only uneconomical manufacturing- and assembly processes resulted, but also the use and maintainance were impaired.

OBJECT OF THE INVENTION

The principal object of the invention is, therefore, to create the conditions to make possible the construction of a reasonably and flexibly adjustable wheel head, wherein even varying diameter ratios and various types of brake actuation can be favorably adjustable to the same axle housing and differential shaft basis within the optimal housing (for instance enabling the use also of different hollow wheels).

SUMMARY OF THE INVENTION

According to the invention, a wheel head with planetary gearing as previously described has its central shaft segmented so that it consists of an axle shaft section running in the hollow axle and a sun wheel shaft or terminal shaft section directly following the driving shaft section and which is replaceably mounted, even in the case of an assembled brake, with the aid of a connection part or sleeve holding them together nonrotatably but detachably.

The axle shaft or driving section and the hollow axle penetrate sufficiently into the housing so as to be overlapped by a hollow wheel carrier into which is integrated an annular brake piston actuatable by a pressure medium or a brake-easing cylinder together with a set of brake springs and pressure actuatable to relieve the force of these brake springs on the stack of brake disks.

According to the invention, therefore, the set of teeth of the sun wheel, the entire reducing gear and in certain cases also the brake disks are now of variable diameters and interchangeable without constructive changes to the axle and that the power assisting actuation of the brake is possible via either spring force or pressure-medium piston, without changing the basic elements of the axle construction (hollow axle, bearing, housing, hollow wheel, and the axle-shaft part)

Advantageously the connection part or sleeve axially bridges the space between the sun gear on the sun gear section and a buffer disk disposed at the end of the hollow axle and the shaft seal provided thereon. This ensures a reliable axial stability of the sun wheel under favorable friction conditions independent from the effective diameter of its planetary wheels and brake disks, as well as the possibility of sealing the inner space of the hollow axle against the housing of the wheel head, so that dirt and oil can not penetrate from the brake area into the area of the differential. By eliminating the usual spacers between the hollow axle and shaft, the latter becomes more adjustable to dimensional changes during operation (due to heat).

Preferably the connection part is, as noted, a sleeve or collar which keeps the sun gear shaft section and the axle shaft section nonrotatably secured to one another by respective sets of teeth mounted thereon. This ensures an easy to fabricate shaft connection, which also facilitates the insertion of different sets of teeth for the brake disks than the ones on the sun wheel.

Radially outwardly thereof, this sleeve carries a spur gear which meshes with inner brake disks alternating with outer brake disks in a stack, the outer brake disks having teeth which engage an inner set of teeth in a hollow wheel surrounding the brake and the planet gears. The spur gear is mounted upon and connected to the sleeve which forms a brake carrier so that the spur gear can be radially spaced from the central shaft sections by a distance equal to the spacing of the planet shafts therefrom. This allows an increase in the support diameter of the internal brake disks and thereby the reduction of the ratio D/d with simultaneous improved oil-supply capacity to the intermediate brake disks via radial bores in the ring gear of the connecting flange. Thereby a radial deflection possibility of even very thin brake disks when pressed together, is avoided in an improved manner, in comparison with the set of teeth of the sun wheel according to prior art, providing a smaller diameter as support. This way it is now possible to either position more friction disks one behind the other or to pair them off with energy-saving lamellar spring plates for the same over-all length. Also, the heat generation is thereby displaced to the more intensively coolable areas in the immediate vicinity of the hollow wheel, improving the general performance of the brakes. Finally, the part of this construction subject to wear remain usable for a longer time and can be manufactured cheaper.

The brake carrier spur gear can have a minimum diameter larger than the outer diameter of a flanged nut by means of which the hollow wheel carrier is secured axially at the end of the hollow axle and communicates with the oil supply ducts leading to the power assistance actuation means. It has a maximum diameter smaller than the inner diameter of an annular pressure disk received in the hollow wheel carrier and which braces the disk stack when the power assistance means is actuated. This ensures first of all a brake disks arrangement which saves on over-all lengths, because the ring gear of the brake carrier and the fastener (flange nut) securing the hollow wheel carrier to the hollow axle as well as the axle-shaft part cover each other at least partially in radial direction.

The power assistance means can either be a piston which is pressurized to operate the brake or set of springs which are relieved by fluid pressure. This makes possible the use of hollow wheel carriers of various construction, respectively of various power-assistance means mounted therein, for hollow axle ends of the same design, respectively in the same hollow wheel.

The brake actuating annular cylinder can be associated with travel steps for the pressure disks on the axle side and shaped as annular pistons. This ensures a gentle operational mode of the brake piston.

The flange nut mounted at the free end of the hollow axle keeps the hollow wheel carrier or the axial wheel bearing under initial stress and is nonrotatably secured by a disk located between the frontal end of the hollow axle and the connection part, this disk having deflected portions inserted into recesses in the nut and in the hollow wheel carrier. This ensures a frictionally favorable cooperation of the flange nut fastener in the case of minimal over-all length, which can be identical for each construction type of the hollow wheel carrier according to the invention, facilitating their possible replacement. The flange nut also supports the annular piston, securing it at the same time.

BRIEF DESCRIPTION OF THE DRAWINGS

The invention is further described with the aid of the drawing which exhaustively illustrates all features. In the drawing:

FIG. 1 is a partial axial section of an annular brake piston in the outer ring of the hollow wheel carrier actuatable by a pressure medium, working against lamellar brake disks and in certain cases retractable by means of return springs; and FIG. 2 is a similar section of another mechanism according to the invention but with a spring-force actuatable pressure ring which cooperates with an annular brake-easing piston between the pressure ring and the hub of the hollow wheel carrier.

SPECIFIC DESCRIPTION

In FIG. 1, in the housing 1 of a wheel head 2 serving as a wheel hub of a vehicle, said housing being axially closed by a cover 3, a planetary gearing 6 is driven via a bisectioned differential shaft 4a, 4b, according to the invention and a sun-wheel gear 5 mounted at its outer end. Its planetary-wheel support pivots 7 are shaped in the mode preferred by the invention to directly carry the cover 3, so that between the pivot 7 or the planetary gears 8 rotatably mounted thereon and the brakes there is only a minimal axial clearance. The wheels 8 are in constant engagement with the sun-wheel gear 5 as well as with the inner set of ring-gear teeth 9 of the hollow wheel 10 which is non-rotatably secured to the hollow axle 12 surrounding the differential shaft 4 via a hollow wheel carrier 11, so that via the pivots 7 the cover 3 or the housing 1 connected thereto is movable with a considerably reduced number of rotations in a direction contrary to the turning direction of the differential shaft 4. The subdivision of said differential shaft according to the invention into a first section 4A (axle shaft) ending approximately with the free extremity 13 of the hollow axle 12 and a second section 4B (sun-wheel shaft) mounted in line with the first is effected so that a parting line 14 is situated approximately in the middle under the inner, and outer brake disks 15, 16, respecting which are non-rotatably centered and secured by a connection part 17 shaped as a collar and engaging in the outer set of teeth 18,19 of the shaft sections 4A, 4B. The collar-shaped connection part 17 does not have therefore to mesh with the set of teeth of the sun wheel 5, but it is possible to replace it for a desired alternate transmission ratio with a proper larger sun wheel (not shown) with the same outer set of teeth 19 as the connection part 17. The connection part has advantageously a brake-carrier spur gear 20 supporting the brake disks 15 and which, through a correspondingly dimensioned brake carrier disk 21 is brought to a diameter approximately corresponding to the circumference of the circle generated by the axes of the planetary support pivots 7. From an oil tank situated before the pivot 7 towards the median part of the brake-carrier spur gear 20, sufficient oil is supplied through approximately radial oil discharge openings 22 due to its increased angular velocity, the oil supply being sufficient due to the action of the centrifugal force, even for high loads to the brake disks 15, 16. The outer brake disks 16 non-rotatably secured in the inner set of teeth 9 of the hollow wheel 10 are alternately arranged with regard to the inner disks 15 so that confronting each of the pressure disks 24, 25 of the brake 15,16 is an outer brake disk 16. The buffer disk 24 at the axle side can be therefore, depending on the type of the power assistance, either an annular piston (FIG. 1) or under the force of an annular pressure spring (FIG. 2). The buffer disk 25 at the gearing side is constructed as a ring unbendable under brake pressure forces, with an approximately uniform width equal to that of the disks 15, 16, said ring (advantageously remaining rotatable and axially movable in the hollow wheel 10, out of reach of the gear grip) being supported close before the planet wheels 7 by a retaining ring 26 inserted in the inner set of teeth 9 axially before the planet wheels 8.

For actuation of the brake, each pressure disk 24 at the axle side (as an annular piston, or as a seat for an annular pressure spring) is slidably guided in the collar 27 of the hollow wheel carrier 11, also mounted axially in the inner gear 9. In order to afford sufficient space either for cylinder 28 (according to FIG. 1) making possible the power assistance and which if needed can have also return springs 29, or for a spring package 30 between the buffer disks 24 and the web 31 of the hollow wheel carrier 11 in spite of compact construction, the web 31 is designed according to a preferred embodiment to have a retraction towards the axle and to partially cover in radial direction the wheel bearings 32 adjacent to the hollow axle 12. In the web 31 (in the case of pressure-actuated brake according to FIG. 1) oil supply ducts 33 to cylinder 38 are provided, said ducts being connected to an oil duct 34 in the hollow axle 12 through the shaft seal 35. This shaft seal 35 is also suited for an alternately usable hollow wheel carrier 11, wherein (according to FIG. 2) a set of springs 30 is located in the collar 27 of the hollow wheel carrier and wherein between the hub 36 and the thereon slidable pressure disk 25 situated on the axle side a brake-easing cylinder 37 is located. Its frontal surface on the gearing side consists of an annular piston 39 axially supported by the hollow axle 12 over its flanged nut 38, said annular piston being sealed against the buffer disk 24 as well as against the hub 36 of the hollow wheel carrier 11. The flanged nut 38 (in both variants) is secured by deflections or bends 42 of a buffer disk 41 with a large surface, which are stamped in the recesses 40 in the frontal surface of the hub 36, said buffer disk 41 being inserted between the free end 13 of the hollow axle 12 and the connecting part 17, respectively preferably adjacent to the brake-carrier pulley 21 originating therefrom. In the widened portion 43 of the annular slot between the axle shaft section 4A and the free end 13 of the hollow axle 12 an annular lip seal 44 to prevent the oil exchange between the wheel head 2 and the differential gearing (not shown) is mounted. This lip seal 44, for the sake of compact construction can be advantageously mounted on a sleeve-shaped projection of the connection part 17 directed towards the hollow axle 12, said projection being inserted in the hollow axle in the area of slot widening 43. The buffer disk 41 as well as the lip seal 44, starting from the cover 3 of the housing 1, can be this way pressed against the hollow axle 12, respectively the axial wheel bearing due to initial stress. For hermetical sealing of the shaft an additional annular seal 46 is advantageously provided thereon, downstream of the connection part 17.

The mode of operation of the brake arrangement according to the invention completes the circuit only when the pressure of the pressure medium in the oil supply ducts 33, 34 and in the oil pressure cylinder 28 is increased, whereby the pressure disks 24 (annular pistons)—insofar as available—counteracting the resistance of the return spring 29 press together axially, more or less strongly, the brake disks 15, 16 rotating with a relative turning ratio against the pressure disks 25. It is of no significance to the invention whether the resetting of the pressure disk 24 under pressure drop is performed by the own resilience of the disks of the brake disks 15, 16 or by the return spring 29. The mode of operation of the brake arrangement according to the invention shown in FIG. 2 completes the circuit due to the spring force under lowered pressure of the pressure medium in the brake-easing cylinder 37 and the braking effect can be eliminated with respect to the spring force only by increasing the pressure of the pressure medium in the oil ducts.

Also arrangements which can differ in detail from the specification are part of the object of this invention, particularly the wheel heads, although having a bilaterally supported planetary-wheel-carrying pivot, present also a differential shaft sectioned in two parts under the brake.

We claim:

1. A wheel head which comprises:
   a wheel head housing forming a wheel hub;
   a central shaft extending axially into said housing from a differential and subdivided axially within said housing into a terminal section and a driving section, said sections being provided with external formations of similar dimensions;
   a planet carrier coupled to said housing and formed with planet shafts overhanging said terminal section and on which respective planet gears are journaled;
   a sun gear formed on said terminal section and meshing with said planet gears;
   a hollow shaft surrounding said planet gears and formed with internal toothing meshing with said planet gears and extending axially over both of said sections;
   a hollow wheel carrier concave in the direction of said planet carrier, surrounding said driving section, spaced from said planet gears and said planet carrier and rotationally fixed to said hollow shaft and rotatable relative to said housing;
   a brake disposed within said hollow shaft between said hollow shaft carrier and said planet carrier, said brake comprising a stack of inner and outer disks in axially interleaved relationship, and a pair of bracing disks at opposite ends of said stack and including a bracing proximal to said planet carrier and a further bracing disk guided on said hollow wheel carrier, said outer disks being rotationally coupled to said hollow shaft;
   a hollow axle extending into said housing and surrounding a portion of said driving section whereby a further portion of said drive section proximal to said terminal section projects beyond said axle and is provided with said formations, said hollow shaft carrier being mounted on said axle;
   a support for said inner disks formed with:
      a sleeve having internal formations engaging said formations on said further portion of said driving section and on said terminal section for angularly coupling said sections together while enabling said terminal section to be removed and to be interchangeable with another terminal section with a sun gear of different diameter, said sleeve being disposed substantially between an end of said axle and said planet carrier,
      a rim disposed radially outwardly of said sleeve at substantially the radial distance of said planet shafts from said central shaft sections and provided with teeth angularly coupled to said inner disks while enabling axial displacement thereof and
      means connecting said rim with said sleeve; and
   power assistance means for said brake received in said hollow shaft carrier and acting upon said further bracing disk.

2. The wheel head defined in claim 1 wherein said sleeve is formed with internal teeth engaging identical and aligned external teeth on said further portion of said driving section and said terminal section of said central shaft constituting said formations.

3. The wheel head defined in claim 2, further comprising means forming a shaft seal between said axle and said hollow wheel carrier.

4. The wheel head defined in claim 1 wherein said rim is a brake carrying spur gear overhanging a flanged nut securing said hollow wheel carrier to said axle and provided with a set of teeth engaged by said inner disks located substantially at the radial distances of the axes of said planet shafts from said central shaft, said spur gear having a maximum diameter less than inner diameters of said bracing disks adjacent said stack.

5. The wheel head defined in claim 4 wherein said spur gear is provided with passages for centrifugally directing oil into said brake.

6. The wheel head defined in claim 1 wherein said power assistance means includes means forming a piston in said hollow wheel carrier supplied with fluid for pressing said further bracing disk against said stack, and at least one spring in said hollow wheel carrier effective against the force of said fluid for drawing said further bracing disk away from said stack.

7. The wheel head defined in claim 1 wherein said power assistance means includes spring means in said hollow wheel carrier biasing said further bracing disk in the direction of said stack, and means for fluid pressurization of said further bracing disk to relieve the pressure thereof on said stack.

8. The wheel head defined in claim 1 wherein said hollow wheel carrier is connected to said axle by a nut threaded onto said axle and a buffer disk radially located between an end of said axle and a web forming said means connecting said rim with said sleeve and having deflected members engaging in recesses of said nut and said hollow wheel carrier.

* * * * *